US012277657B2

(12) United States Patent
Pan et al.

(10) Patent No.: US 12,277,657 B2
(45) Date of Patent: *Apr. 15, 2025

(54) TRACKING AN AUGMENTED REALITY DEVICE

(71) Applicant: Snap Inc., Santa Monica, CA (US)

(72) Inventors: Qi Pan, London (GB); Edward James Rosten, London (GB); Andrew Tristan Spek, London (GB); Supannee Tanathong, London (GB)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/221,179

(22) Filed: Jul. 12, 2023

(65) Prior Publication Data

US 2023/0368476 A1 Nov. 16, 2023

Related U.S. Application Data

(63) Continuation of application No. 17/083,722, filed on Oct. 29, 2020, now Pat. No. 11,748,954.

(60) Provisional application No. 62/704,881, filed on Jun. 1, 2020.

(51) Int. Cl.
G06T 19/00 (2011.01)
G06T 7/70 (2017.01)

(52) U.S. Cl.
CPC .............. *G06T 19/006* (2013.01); *G06T 7/70* (2017.01)

(58) Field of Classification Search
CPC .................................................. G06T 19/006
See application file for complete search history.

(56) References Cited

U.S. PATENT DOCUMENTS

| | | | |
|---|---|---|---|
| 9,652,896 B1 | 5/2017 | Jurgenson et al. |
| 9,984,499 B1 | 5/2018 | Jurgenson et al. |
| 11,276,201 B1 | 3/2022 | Garcia Sopo et al. |
| 11,748,954 B2 | 9/2023 | Pan et al. |
| 11,854,231 B2 | 12/2023 | Garcia Sopo et al. |
| 2010/0257252 A1 | 10/2010 | Dougherty et al. |
| 2014/0232637 A1 | 8/2014 | Park et al. |
| 2015/0172626 A1 | 6/2015 | Martini |

(Continued)

FOREIGN PATENT DOCUMENTS

| | | |
|---|---|---|
| CN | 108283018 | 7/2018 |
| CN | 111133473 | 5/2020 |

(Continued)

OTHER PUBLICATIONS

"U.S. Appl. No. 15/929,976, 312 Amendment filed Jan. 28, 2022", 8 pgs.

(Continued)

*Primary Examiner* — Charles Tseng
(74) *Attorney, Agent, or Firm* — Schwegman Lundberg & Woessner, P.A.

(57) ABSTRACT

An augmented reality device generates an updated position and orientation (pose) value by initially determining, using image-based processing, a pose estimate from a current image frame, a previous image frame and a previous pose. An IMU pose is then obtained from data generated by an inertial measurement unit including motion sensors, and transformation between the pose estimate and the IMU pose is determined. The transformation is applied to the pose estimate to generate a pose update. Media content is applied to a position within an image, the position being based on the pose update.

20 Claims, 6 Drawing Sheets

(56) References Cited

U.S. PATENT DOCUMENTS

| | | | |
|---|---|---|---|
| 2015/0310665 | A1 | 10/2015 | Michail et al. |
| 2016/0253819 | A1 | 9/2016 | Mendez Mendez et al. |
| 2017/0109930 | A1 | 4/2017 | Holzer et al. |
| 2018/0061072 | A1 | 3/2018 | Benezra et al. |
| 2018/0061139 | A1 | 3/2018 | Rodriguez et al. |
| 2018/0137651 | A1 | 5/2018 | Levinshtein et al. |
| 2018/0364731 | A1 | 12/2018 | Liu et al. |
| 2019/0329407 | A1 | 10/2019 | Qi et al. |
| 2020/0080849 | A1 | 3/2020 | Ondruska et al. |
| 2020/0082635 | A1 | 3/2020 | Zhu et al. |
| 2020/0134911 | A1 | 4/2020 | Van Hoff et al. |
| 2020/0159242 | A1 | 5/2020 | Liu et al. |
| 2021/0049784 | A1 | 2/2021 | Törö et al. |
| 2021/0089572 | A1 | 3/2021 | Lawlor et al. |
| 2021/0375054 | A1 | 12/2021 | Pan et al. |
| 2022/0156976 | A1 | 5/2022 | Garcia Sopo et al. |

FOREIGN PATENT DOCUMENTS

| | | | |
|---|---|---|---|
| CN | 115699096 | A | 2/2023 |
| CN | 115699096 | | 2/2024 |
| CN | 118052960 | | 5/2024 |
| KR | 20190134589 | | 12/2019 |
| KR | 20200037502 | | 4/2020 |
| WO | WO-2018159168 | A1 | 9/2018 |
| WO | WO-2021247362 | A1 | 12/2021 |

OTHER PUBLICATIONS

"U.S. Appl. No. 15/929,976, Corrected Notice of Allowability mailed Feb. 9, 2022", 2 pgs.
"U.S. Appl. No. 15/929,976, Non Final Office Action mailed Jan. 28, 2021", 18 pgs.
"U.S. Appl. No. 15/929,976, Notice of Allowance mailed Jun. 24, 2021", 9 pgs.
"U.S. Appl. No. 15/929,976, Notice of Allowance mailed Nov. 4, 2021", 11 pgs.
"U.S. Appl. No. 15/929,976, PTO Response to Rule 312 Communication mailed Sep. 10, 2021", 2 pgs.
"U.S. Appl. No. 15/929,976, Response filed Apr. 28, 2021 to Non Final Office Action mailed Jan. 28, 2021", 12 pgs.
"U.S. Appl. No. 17/083,722, Advisory Action mailed Feb. 4, 2022", 5 pgs.
"U.S. Appl. No. 17/083,722, Appeal Brief filed May 23, 2022", 22 pgs.
"U.S. Appl. No. 17/083,722, Appeal Decision mailed Feb. 14, 2023", 8 pgs.
"U.S. Appl. No. 17/083,722, Decision on Pre-Appeal Brief Request for Review mailed Mar. 29, 2022", 2 pgs.
"U.S. Appl. No. 17/083,722, Examiner's Answer mailed Jun. 29, 2022", 15 pgs.
"U.S. Appl. No. 17/083,722, Final Office Action mailed Nov. 29, 2021", 20 pgs.
"U.S. Appl. No. 17/083,722, Non Final Office Action mailed Aug. 6, 2021", 20 pgs.
"U.S. Appl. No. 17/083,722, Notice of Allowance mailed Apr. 28, 2023", 9 pgs.
"U.S. Appl. No. 17/083,722, Pre-Appeal Brief Request for Review filed Mar. 23, 2022", 5 pgs.
"U.S. Appl. No. 17/083,722, Response filed Jan. 26, 2022 to Final Office Action mailed Nov. 29, 2021", 12 pgs.
"U.S. Appl. No. 17/083,722, Response filed Nov. 8, 2021 to Non Final Office Action mailed Aug. 6, 2021", 10 pgs.
"U.S. Appl. No. 17/589,523, Non Final Office Action mailed Apr. 10, 2023", 17 pgs.
"U.S. Appl. No. 17/589,523, Notice of Allowance mailed Aug. 11, 2023", 9 pgs.
"U.S. Appl. No. 17/589,523, Response filed Jul. 10, 2023 to Non Final Office Action mailed Apr. 10, 2023", 13 pgs.
"European Application Serial No. 21817090.0, Response Filed Jul. 10, 2023 to Communication pursuant to Rules 161(2) and 162 EPC mailed Jan. 25, 2023", 13 pgs.
"International Application Serial No. PCT/US2021/034517, International Preliminary Report on Patentability mailed Dec. 15, 2022", 6 pgs.
"International Application Serial No. PCT/US2021/034517, International Search Report mailed Sep. 7, 2021", 3 pgs.
"International Application Serial No. PCT/US2021/034517, Written Opinion mailed Sep. 7, 2021", 4 pgs.
Fox, Dieter, et al., "Monte Carlo Localization: Efficient Position Estimation for Mobile Robots", AAAI-99 Proceedings, (Jul. 18-19, 1999), 7 pgs.
Fukuda, Tomohiro, et al., "Improvement of registration accuracy of a handheld augmented reality system for urban landscape simulation", Frontiers of Architectural Research, 3(4), (2014), 386-397.
Gaglione, S, et al., "Position Accuracy Analysis of a Robust Vision-Based Navigation System", International Archives of the Photogrammetry, Remote Sensing & Spatial Information Sciences, (2018), 7 pgs.
Lobo, Jorge, et al., "Vision and Inertial Sensor Cooperation Using Gravity as a Vertical Reference", IEEE Transactions on Pattern Analysis and Machine Intelligence, 25(12), (Dec. 2003), 1597-1608.
Ma, Shujun, et al., "Robust Stereo Visual-Inertial Odometry Using Nonlinear Optimization", Sensors, 19(17), 3747, (Aug. 29, 2019), 15 pgs.
Xiao, Zhongyang, et al., "Monocular Vehicle Self-localization method based on Compact Semantic Map", IEEE 21st International Conference on Intelligent Transportation Systems (ITSC), Maui, HI, USA, (Nov. 4-7, 2018), 3083-3090.
"Korean Application Serial No. 10-2022-7046076, Notice of Preliminary Rejection mailed Dec. 18, 2023", w/ English Translation, 9 pgs.
"European Application Serial No. 21817090.0, Extended European Search Report mailed Jun. 14, 2024", 8 pgs.
"Korean Application Serial No. 10-2022-7046076, Final Office Action mailed Aug. 13, 2024", w/ English translation, 6 pgs.
Lynen, Simon, "Large-scale, real-time visual-inertial localization revisited", arxiv.org, Cornell University Library, 201 Olin Library Cornell University Ithaca, NY 14853, (Jun. 30, 2019), 21 pgs.

TRACKING AN AUGMENTED REALITY DEVICE

CROSS-REFERENCE TO RELATED APPLICATIONS

This application is a continuation of U.S. patent application Ser. No. 17/083,722 filed on Oct. 29, 2020, which claims the benefit of U.S. Provisional Patent Application No. 62/704,881 filed on Jun. 1, 2020, the contents of which are hereby incorporated by reference in their entirety.

BACKGROUND

Augmented reality (AR) refers to systems, methods, devices, and instructions that can capture image frames, enhance those image frames with additional information, and then present the enhanced information on a display. This may, for example, enable a user to hold up a mobile computing device (e.g., smart phone or tablet) to capture a video stream of a scene, and an output display of the mobile computing device may present the scene as visible to the user along with additional information. This additional information may include placing virtual objects in the scene so that the virtual objects are presented as if they exist in the scene. Such virtual objects are also processed to maintain their relationship with real objects as both real and virtual objects move over time, and as the perspective of the image sensor capturing the environment changes.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
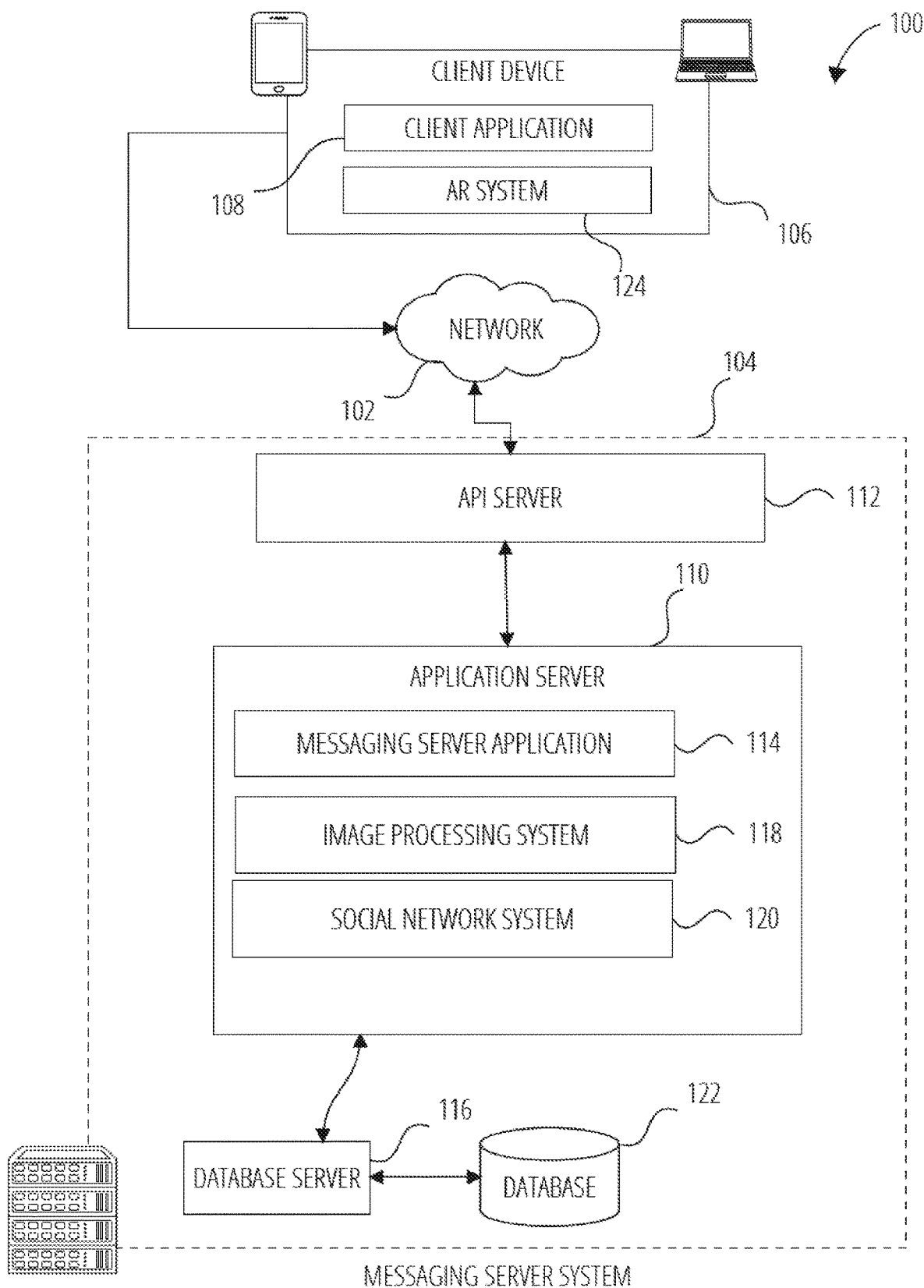
FIG. 1 is a diagrammatic representation of a networked environment in which the present disclosure may be deployed, in accordance with some examples.

There are a number of requirements needed to permit the correct placement of a virtual object into a video stream or an image of a real scene. One requirement is the existence of a 3D model that has features that correspond with features in the real world. The generation of a 3D model is referred to as "mapping" and typically involves locating recognizable features in the real world and recording them in the 3D model. While the features recorded in the 3D model are typically referred to as "landmarks," they may be little more than points or edges corresponding to corners or edges of structures or items in the real world. Mapping may be done by processing a number of different images of a scene to extract landmarks and place them in the 3D model. One technique for such mapping is known as SfM (Structure from Motion). The concepts describe herein are applicable, regardless of whether the 3D model is generated on the fly (as in SfM) or is preexisting.

Another requirement is for the position and orientation (aka the "pose") of the device being used to capture the scene to be determined initially, which is referred to as localization. Localization involves determining the orientation (rotation) of the device along three axes (pitch, yaw and roll) and the position of the device along three axes, for a total of six degrees of freedom. The goal of localization is to align the device's viewpoint in the real world to its virtual viewpoint in a 3D model given no prior pose information.

Once the device's pose has been determined, a virtual viewpoint in the 3D model can be generated that corresponds to the device's actual viewpoint, which then permits the positioning of virtual objects into the image of the scene that is generated by the device.

If the device moves in any way, "tracking" refers to attempts to align the device's updated viewpoint or pose to the 3D model, given a prior estimate of the pose. Initially, this pose is provided by localization. The concepts described herein relate primarily but not exclusively to tracking, and device functionality that provides tracking is known as a tracker.

Improving the initial pose used to localize the device, and improving the tracking of a device post-localization, permits more accurate and/or more stable positioning of virtual objects (or other enhancing information) in images or in an image stream to be displayed to a user using a display device. Accordingly, the methods and systems described herein improve the functioning of a device or system that includes augmented reality functionality.

As described herein, given a 3D model of a scene and an existing pose, the tracker can update the position of a user's device relative to the 3D model using a combination of the device's camera stream, and accelerometer and gyro information in real-time. The tracker takes a hybrid approach of tracking camera motion both via visual odometry and motion sensor information and persistently re-positioning its pose relative to the model using a combined approach. This approach is more robust to tracking failure than simply tracking image features, which can become difficult to match in high motion, while also being robust to sensor drift which can occur in sensor-only odometry.

Given a previous pose for a previous image frame, the tracking system performs the following tasks when there is a newly captured image aka the current frame. Firstly, the current pose is estimated by performing image-similarity measurements between the current and previous frames.

Image keypoints and descriptors are then extracted from the current frame and matched with landmarks in the 3D model. The camera pose is then refined using the extracted keypoints (2D image points) and the tracked landmarks, together with the sensor data as described in more detail below. The resulting final pose is then low-pass filtered to remove high-frequency jitter.

In one example, a method of operating an augmented reality device is disclosed, comprising: determining, using image-based processing, a current-image pose estimate from a current image frame, a previous image frame and a previous pose, receiving an IMU pose determined from data generated by an inertial measurement unit including motion sensors, determining a transformation between the pose estimate and the IMU pose, and applying the transformation to the pose estimate to generate a pose update. Media content can then be applied to a position within an image, the position being based on the pose update.

The method may further comprise low-pass filtering the transformation prior to applying the transformation to the pose estimate. The image-based processing may comprise determining an intermediate pose by comparing the current image frame to the previous image frame, determining an intermediate pose by comparing features in the current image frame with features in a 3D model, and/or determining the pose estimate by comparing features in the current image with features in a 3D model. The image-based processing may further comprise determining the pose estimate by comparing features in the current image frame with features in a 3D model using either one or both of the intermediate poses mentioned above. The IMU pose may also be determined as an interpolated value between two IMU pose values having timestamps adjacent to a timestamp of the pose estimate.

In another example, provided is a non-transitory machine-readable medium including instructions which, when read by a machine, cause the machine to perform operations for generating a pose for an augmented reality system, comprising: determining, using image-based processing, a current-image pose estimate from a current image frame, a previous image frame and a previous pose, receiving an IMU pose determined from data generated by an inertial measurement unit including motion sensors, determining a transformation between the pose estimate and the IMU pose, and applying the transformation to the pose estimate to generate a pose update. Media content can then be applied to a position within an image, the position being based on the pose update.

The instructions may cause the machine to perform operations further comprising low-pass filtering the transformation prior to applying the transformation to the pose estimate. The instructions may cause the machine to determine an intermediate pose by comparing the current image frame to the previous image frame, determine an intermediate pose by comparing features in the current image frame with features in the previous frame, and/or determine the pose estimate by comparing features in the current image frame with features in a 3D model. The pose estimate may further be determined by the machine by comparing features in the current image with features in a 3D model using either or both of the intermediate poses mentioned. above. The instructions may cause the machine to determine IMU pose as an interpolated value between two IMU pose values having timestamps adjacent to a timestamp of the pose estimate.

In another example, provided is an augmented reality system comprising one or more processors, motion-sensing components, an image capture device to generate image frames, and one or more machine-readable mediums storing instructions that, when executed by the one or more processors, cause the system to perform operations comprising: determining, using image-based processing, a current-image pose estimate from a current image frame, a previous image frame and a previous pose, receiving an IMU pose determined from data generated by the motion-sensing components, determining a transformation between the pose estimate and the IMU pose, and applying the transformation to the pose estimate to generate a pose update. Media content can then be applied to a position within an image, the position being based on the pose update.

The instructions may cause the augmented reality system to perform operations further comprising low-pass filtering the transformation prior to applying the transformation to the pose estimate. The instructions may cause the augmented reality system to determine an intermediate pose by comparing the current image frame to the previous image frame, determine an intermediate pose by comparing features in the current image frame with features in the previous frame, and/or determine the pose estimate by comparing features in the current image frame with features in a 3D model. The pose estimate may further be determined by the augmented reality system by comparing features in the current image with features in a 3D model using either or both of the intermediate poses mentioned. above. The instructions may cause the augmented reality system to determine IMU pose as an interpolated value between two IMU pose values having timestamps adjacent to a timestamp of the pose estimate.

FIG. 1 is a block diagram showing an example messaging system 100 for exchanging data (e.g., messages and associated content) over a network. The messaging system 100 includes multiple instances of a client device 106, each of which hosts a number of applications including a client application 108 and an AR system 124. While illustrated separately from the client application 108 in FIG. 1, the AR system 124 is implemented in one example as a subcomponent of client application 108, and the AR system 124 operates under the management of client application 108. Each client application 108 is communicatively coupled to other instances of the client application 108 and a messaging server system 104 via a network 102 (e.g., the Internet).

A client application 108 is able to communicate and exchange data with another client application 108 and with the messaging server system 104 via the network 102. The data exchanged between client application 108, and between a client application 108 and the messaging server system 104, includes functions (e.g., commands to invoke functions) as well as payload data (e.g., text, audio, video or other multimedia data). The messaging system 100 may be used to communicate information for virtual objects to be displayed on client devices 106, image data used to create 3D models, and the resulting 3D point models or model data as they are used by the AR system 124.

The messaging server system 104 provides server-side functionality via the network 102 to a particular client application 108. While certain functions of the messaging system 100 are described herein as being performed by either a client application 108 or by the messaging server system 104, the location of certain functionality either within the client application 108, the AR system 124 or the messaging server system 104 is a design choice. For example, it may be technically preferable to initially deploy certain technology and functionality within the messaging server system 104, but to later migrate this technology and functionality to the client application 108 where a client device 106 has a sufficient processing capacity.

As illustrated in FIG. 1, the messaging system 100 or the client application 108 includes AR system 124 that provides functionality to generate augmented reality images. In some examples, the AR system 124 can be implemented as a standalone system on client application 108 and is not necessarily included in the messaging system 100. In other examples, the client application 108 or client device 106 include a portion of the AR system 124 (e.g., a portion of the augmented reality system 124 may be included independently or in the client application 108). In examples where the client device 106 includes a portion of the AR system 124, the client device 106 can work alone or in conjunction with the portion of the AR system 124 included in a particular application server or otherwise included in the messaging system 100.

The messaging server system 104 supports various services and operations that are provided to the client application 108. Such operations include transmitting data to, receiving data from, and processing data generated by the client application 108. This data may include message content, 3D model data, geolocation information, media annotation and overlays, virtual object data, message content persistence conditions, social network information, and live event information, as examples. Data exchanges within the messaging system 100 are invoked and controlled through functions available via user interfaces (UIs) of the client application 108.

Turning now specifically to the messaging server system 104, an Application Program Interface (API) server 112 is coupled to, and provides a programmatic interface to, an application server 110. The application server 110 is communicatively coupled to a database server 116, which facilitates access to a database 122 in which is stored data associated with messages and other data processed by the application server 110.

The Application Program Interface (API) server 112 receives and transmits message data (e.g., commands and message payloads) between the Client device 106 and the application server 110. Specifically, the Application Program Interface (API) server 112 provides a set of interfaces (e.g., routines and protocols) that can be called or queried by the client application 108 in order to invoke functionality of the application server 110. The Application Program Interface (API) server 112 exposes various functions supported by the application server 110, including account registration, login functionality, the sending of messages, via the application server 110, from a particular client application 108 to another client application 108, the sending of media files (e.g., images or video) from a client application 108 to the messaging server application 114, and for possible access by another client application 108, the setting of a collection of media data (e.g., story), the retrieval of a list of friends of a user of a Client device 106, the retrieval of such collections, the retrieval of messages and content, the adding and deletion of friends to a social graph, the location of friends within a social graph, and opening an application event (e.g., relating to the client application 108).

The application server 110 hosts a number of applications and subsystems, including a messaging server application 114, an image processing system 118 and a social network system 120. The messaging server application 114 implements a number of message processing technologies and functions, particularly related to the aggregation and other processing of content (e.g., textual and multimedia content) included in messages received from multiple instances of the client application 108. As will be described in further detail, the text and media content from multiple sources may be aggregated into collections of content (e.g., called stories or galleries). These collections are then made available, by the messaging server application 114, to the client application 108. Other Processor and memory intensive processing of data may also be performed server-side by the messaging server application 114, in view of the hardware requirements for such processing.

The application server 110 also includes an image processing system 118 that is dedicated to performing various image processing operations, typically with respect to images or video received within the payload of a message at the messaging server application 114. The image processing system 118 may also be responsible for generating and or hosting 3D model and virtual object data.

The application server 110 is communicatively coupled to a database server 116, which facilitates access to a database 122 in which is stored data generated by or required by operation of the messaging system 100.

Figure 2:
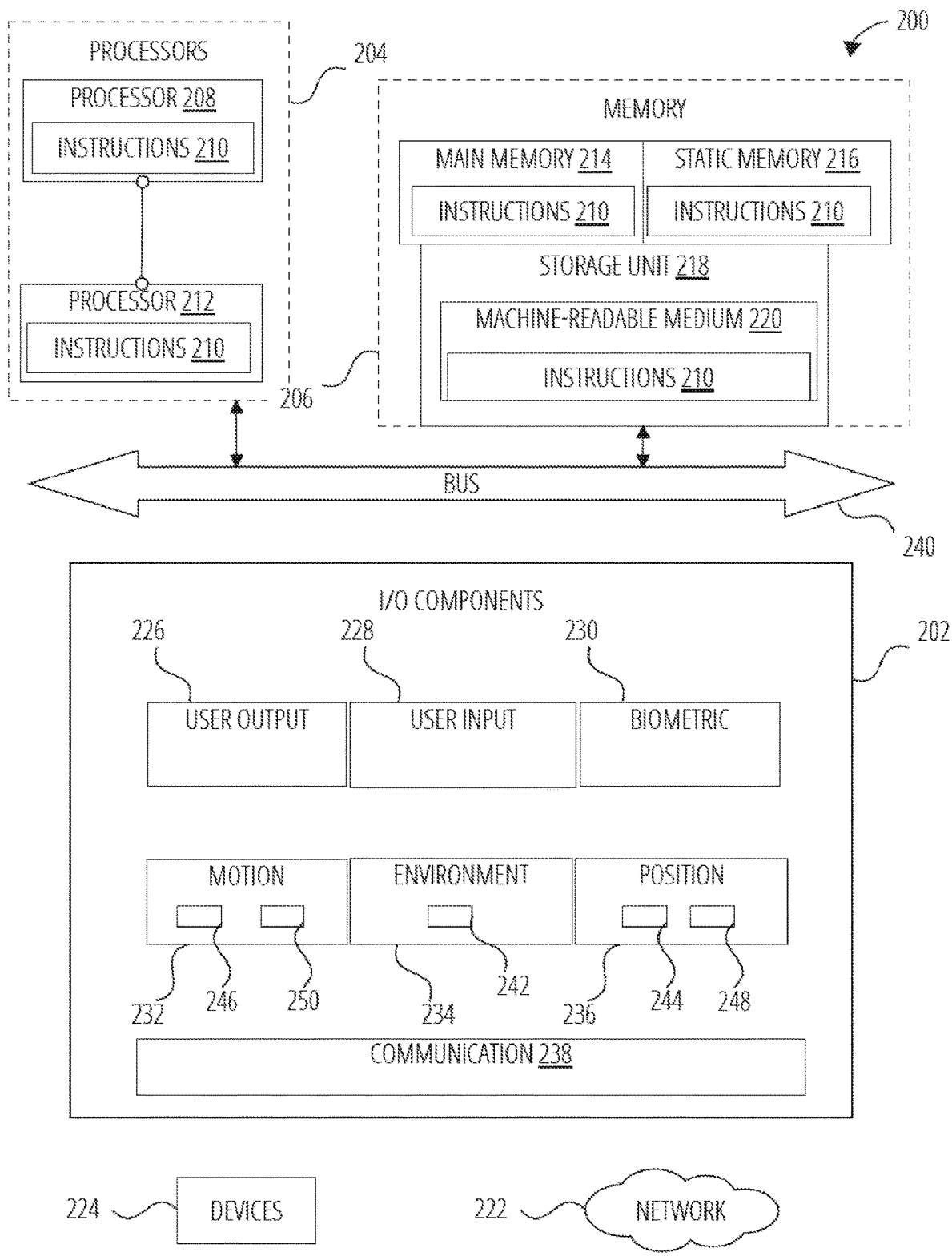
FIG. 2 is a diagrammatic representation of a machine in the form of a computer system within which a set of instructions may be executed for causing the machine to perform any one or more of the methodologies discussed herein, in accordance with some examples.

FIG. 2 is a diagrammatic representation of the machine 200 within which instructions 210 (e.g., software, a program, an application, an applet, an app, or other executable code) for causing the machine 200 to perform any one or more of the methodologies discussed herein may be executed. For example, the instructions 210 may cause the machine 200 to execute any one or more of the methods described herein. The instructions 210 transform the general, non-programmed machine 200 into a particular machine 200 programmed to carry out the described and illustrated functions in the manner described. The machine 200 may operate as a standalone device or may be coupled (e.g., networked) to other machines. In a networked deployment, the machine 200 may operate in the capacity of a server machine or a client machine in a server-client network environment, or as a peer machine in a peer-to-peer (or distributed) network environment. The machine 200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 210, sequentially or otherwise, that specify actions to be taken by the machine 200. Further, while only a single machine 200 is illustrated, the term "machine" shall also be taken to include a collection of machines that individually or jointly execute the instructions 210 to perform any one or more of the methodologies discussed herein.

The machine 200 may include processors 204, memory 206, and I/O components 202, which may be configured to communicate with each other via a bus 240. In some examples, the processors 204 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 208 and a Processor 212 that execute the instructions 210. The term "Processor" is intended to include multi-core processors that may comprise two or more independent processors (sometimes referred to as "cores") that may execute instructions contemporaneously. Although FIG. 2 shows multiple processors 204, the machine 200 may include a single Processor with a single core, a single Processor with multiple cores (e.g., a multi-core Processor), multiple processors with a single core, multiple processors with multiples cores, or any combination thereof.

The memory 206 includes a main memory 214, a static memory 216, and a storage unit 218, both accessible to the processors 204 via the bus 240. The main memory 206, the static memory 216, and storage unit 218 store the instructions 210 embodying any one or more of the methodologies or functions described herein. The instructions 210 may also reside, completely or partially, within the main memory 214, within the static memory 216, within machine-readable medium 220 within the storage unit 218, within at least one of the processors 204 (e.g., within the Processor's cache memory), or any suitable combination thereof, during execution thereof by the machine 200.

The I/O components 202 may include a wide variety of components to receive input, provide output, produce output, transmit information, exchange information, capture measurements, and so on. The specific I/O components 202 that are included in a particular machine will depend on the type of machine. For example, portable machines such as mobile phones may include a touch input device or other such input mechanisms, while a headless server machine will likely not include such a touch input device. It will be appreciated that the I/O components 202 may include many other components that are not shown in FIG. 2. In various examples, the I/O components 202 may include user output components 226 and user input components 228. The user output components 226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 228 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 202 may include biometric components 230, motion sensing components 232, environmental components 234, or position components 236, among a wide array of other components. For example, the biometric components 230 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion sensing components 232 include acceleration sensor components (e.g., accelerometers 246), rotation sensor components (e.g., gyroscopes 250) etc. The environmental components 234 include, for example, one or cameras 242 (with still image/photograph and video capabilities) or other image capture devices, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 236 may include location sensor components (e.g., GPS receiver 244), altitude sensor components (e.g., altimeters or barometers that detect air pressure from which altitude may be derived), orientation sensor components (e.g., magnetometers 248), and the like. The I/O components 202 may also include derived sensors such as a gravity sensor, which provides a gravity vector relative to the orientation of the client device 106. The gravity sensor is typically derived from the accelerometers 246, where other sensors (e.g. the magnetometers 248 and the gyroscopes 250) help to remove linear acceleration from the accelerometer data.

Communication may be implemented using a wide variety of technologies. The I/O components 202 further include communication components 238 operable to couple the machine 200 to a network 222 or devices 224 via respective coupling or connections. For example, the communication components 238 may include a network interface Component or another suitable device to interface with the network 222. In further examples, the communication components 238 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 224 may be another machine or any of a wide variety of peripheral devices (e.g., a peripheral device coupled via a USB).

Moreover, the communication components 238 may detect identifiers or include components operable to detect identifiers. For example, the communication components 238 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 238, such as location via Internet Protocol (IP) geolocation, location via Wi-Fi® signal triangulation, location via detecting an NFC beacon signal that may indicate a particular location, and so forth.

The various memories (e.g., main memory 214, static memory 216, and/or memory of the processors 204) and/or storage unit 218 may store one or more sets of instructions and data structures (e.g., software) embodying or used by any one or more of the methodologies or functions described herein. These instructions (e.g., the instructions 210), when executed by processors 204, cause various operations to implement the disclosed examples.

The instructions 210 may be transmitted or received over the network 222, using a transmission medium, via a network interface device (e.g., a network interface Component included in the communication components 238) and using any one of several well-known transfer protocols (e.g., hypertext transfer protocol (HTTP)). Similarly, the instructions 210 may be transmitted or received using a transmission medium via a coupling (e.g., a peer-to-peer coupling) to the devices 224.

Figure 3:
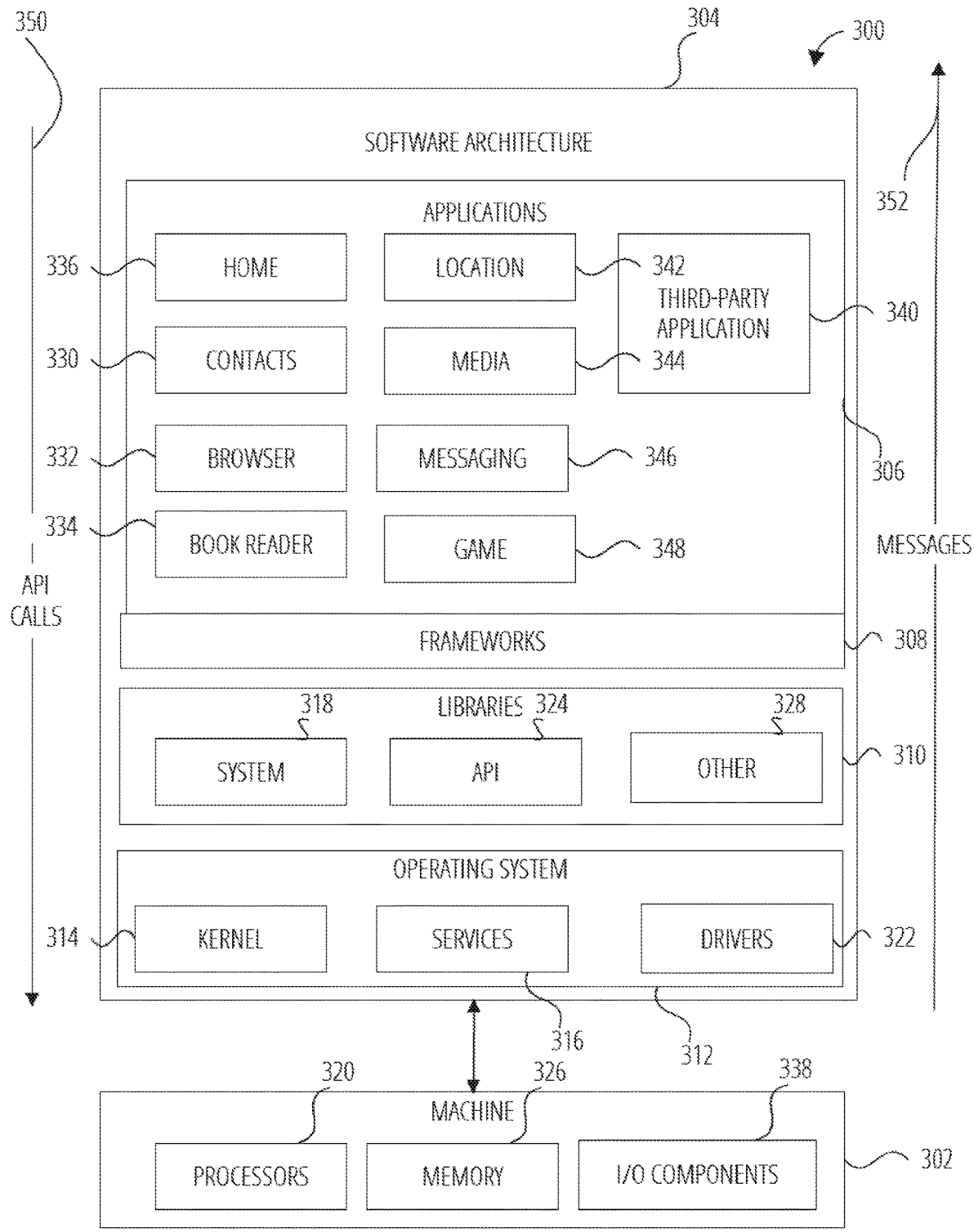
FIG. 3 is block diagram showing a software architecture within which the present disclosure may be implemented, according to some examples.

FIG. 3 is a block diagram 300 illustrating a software architecture 304, which can be installed on any one or more of the devices described herein. The software architecture 304 is supported by hardware such as a machine 302 that includes processors 320, memory 326, and I/O components 338. In this example, the software architecture 304 can be conceptualized as a stack of layers, where each layer provides a particular functionality. The software architecture 304 includes layers such as an operating system 312, libraries 310, frameworks 308, and applications 306. Operationally, the applications 306 invoke API calls 350 through the software stack and receive messages 352 in response to the API calls 350.

The operating system 312 manages hardware resources and provides common services. The operating system 312 includes, for example, a kernel 314, services 316, and drivers 322. The kernel 314 acts as an abstraction layer between the hardware and the other software layers. For example, the kernel 314 provides memory management, Processor management (e.g., scheduling), Component management, networking, and security settings, among other functionality. The services 316 can provide other common services for the other software layers. The drivers 322 are responsible for controlling or interfacing with the underlying hardware. For instance, the drivers 322 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 310 provide a low-level common infrastructure used by the applications 306. The libraries 310 can include system libraries 318 (e.g., C standard library) that provide functions such as memory allocation functions, string manipulation functions, mathematic functions, and the like. In addition, the libraries 310 can include API libraries 324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 310 can also include a wide variety of other libraries 328 to provide many other APIs to the applications 306.

The frameworks 308 provide a high-level common infrastructure that is used by the applications 306. For example, the frameworks 308 provide various graphical user interface (GUI) functions, high-level resource management, and high-level location services. The frameworks 308 can provide a broad spectrum of other APIs that can be used by the applications 306, some of which may be specific to a particular operating system or platform.

In some examples, the applications 306 may include a home application 336, a contacts application 330, a browser application 332, a book reader application 334, a location application 342, a media application 344, a messaging application 346, a game application 348, and a broad assortment of other applications such as a third-party application 340. The applications 306 are programs that execute functions defined in the programs. Various programming languages can be employed to create one or more of the applications 306, structured in a variety of manners, such as object-oriented programming languages (e.g., Objective-C, Java, or C++) or procedural programming languages (e.g., C or assembly language). In a specific example, the third-party application 340 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 340 can invoke the API calls 350 provided by the operating system 312 to facilitate functionality described herein.

Figure 4:
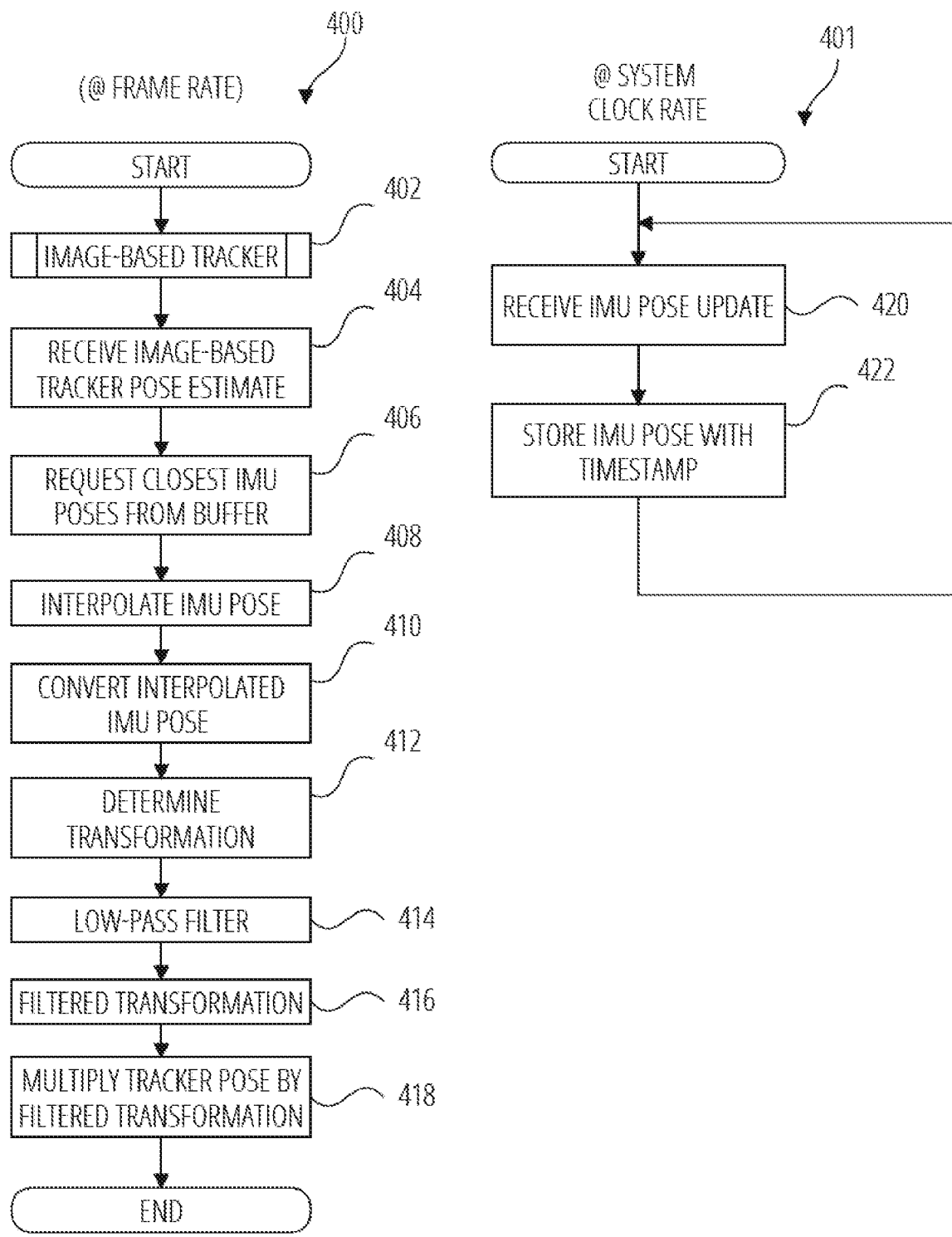
FIG. 4 is a flowchart illustrating a tracking method, according to some examples.

FIG. 4 is a flowchart illustrating a tracking method according to one example, typically executing in the AR system 124 of a client device 106. As can be seen from the figure, there are two methods running concurrently. On the left is the tracking method 400 itself, commencing at subroutine block 402. On the right is an associated IMU method 401 that collects and stores data generated by the position components 236 and associated firmware (collectively referred to as the inertial measurement unit or IMU) for use by the tracking method 400 itself. The tracking method 400 operates at the frame rate of the camera 242 while the IMU method 401 operates at the system clock rate.

The IMU method 401 commences at block 420 with the AR system 124 receiving an IMU pose based on the data generated by the IMU of the client device 106. The IMU pose has an associated time stamp. The AR system 124 stores the IMU pose and time stamp at block 422 in a buffer that is large enough to provide as many timestamped pose readings as are required for the operation of the tracking method 400, given the difference in the frame rate of the camera and the system clock rate of the IMU. After block 422, the method returns to block 420 as shown, for the AR system 124 to receive another IMU pose update.

The tracking method 400 commences at subroutine block 402 with an image-based tracking method performed by the AR system 124, which provides an estimated pose output from an initial pose, an initial image frame and an updated image frame. While any image-based tracking method can be used, an illustrative image-based tracking method that can be used in subroutine block 402 is described below with reference to FIG. 5.

At block 404, an updated pose estimate is received by the AR system 124 from the image-based tracking method. The updated pose estimate is timestamped with the timestamp of the updated image frame on which it is based. At block 406, the two IMU poses that are time-adjacent to the tracker pose estimate (e.g. before and after) are obtained from the buffer by the AR system 124. The AR system 124 then determines an interpolated IMU pose at the time of the updated pose estimate using the two timestamped IMU poses and the timestamp of the updated image frame at block 408.

The interpolated IMU pose and the image-based tracker pose estimate cannot be combined directly since they are in different coordinate frames. Accordingly, the AR system 124 first converts the interpolated IMU pose into the coordinate system used by the image-based tracker at block 410. The AR system 124 then determines a transformation that takes the pose from the interpolated IMU pose to the image-based pose, at block 412.

At block 414, the resulting sequences of transformations (e.g. generated by previous iterations of the tracking method 400 and including the current transformation) is low-pass filtered by the AR system 124 to remove high-frequency jitter. The output of the IMU is at a high frequency and can be noisy, affecting the output of the IMU pose. Similarly, the output of the pose from the image-based tracker can have a slight misalignment that would be within the tolerances of the tracking system but that might generate a poor experience when attempting to use AR content. Furthermore, combining the two pose signals together directly will exacerbate the problem. Accordingly, the AR system 124 uses a suitable low-pass filter to compute a smoothed version of the transformations computed in block 412.

The final pose reported by the tracking method 400 performed by the AR system 124 is determined in block 418 by the AR system 124 multiplying the converted and interpolated IMU pose from block 410 with the low-pass filtered transformation of block 416.

Figure 5:
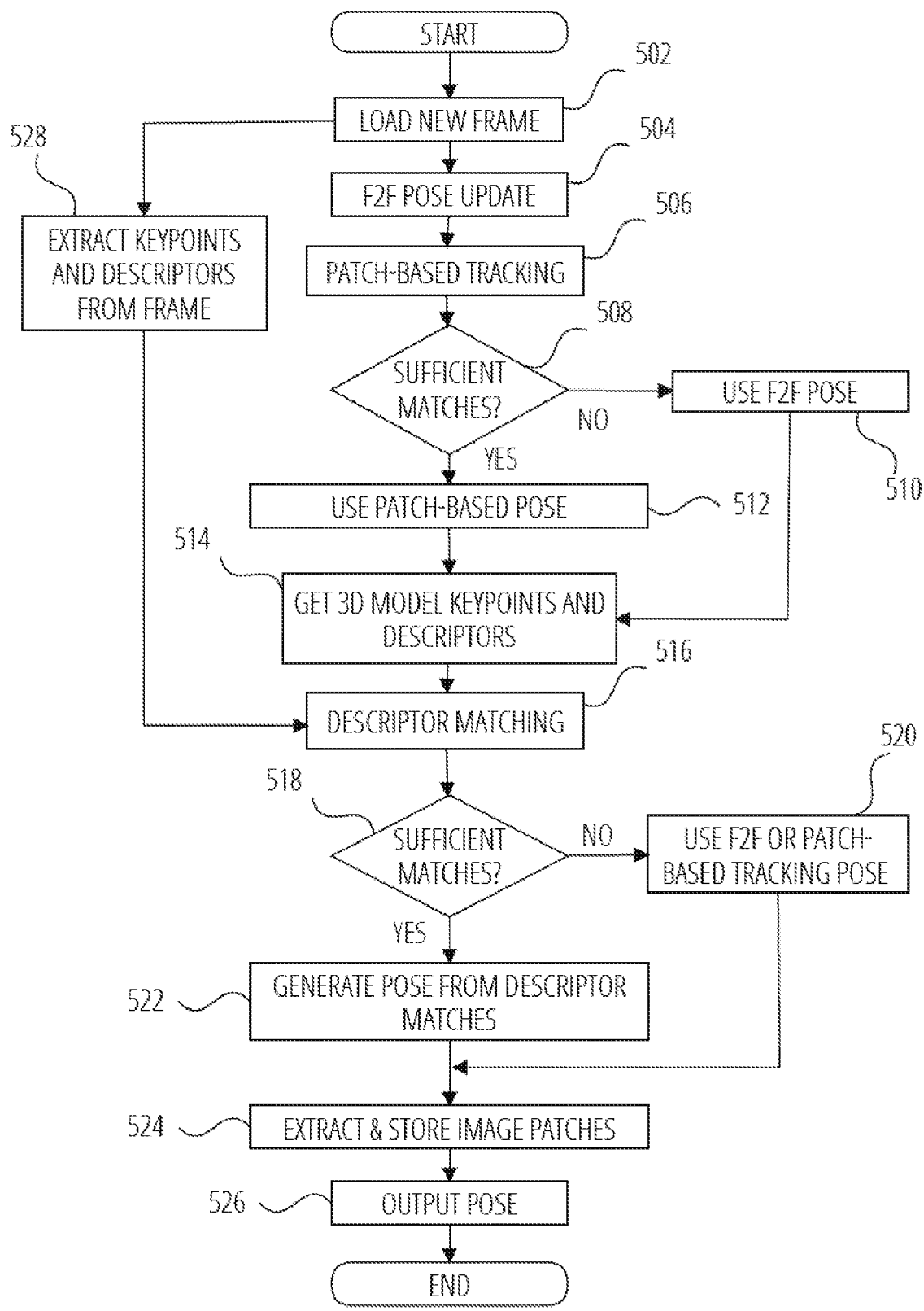
FIG. 5 is a flowchart illustrating an image-based tracker method that is suitable for use in the method of FIG. 4, according to some examples.

FIG. 5 is an example of an image-based tracker method that is suitable for use in subroutine block 402 in FIG. 4. The method commences at block 502 with the loading of a new image frame received by the AR system 124 from the camera 242. At block 504, the AR system 124 performs a frame-to-frame alignment method to estimate the transformation of the previous frame to the current frame. One example of a frame to frame (F2F) alignment method that may be used is ESM (Efficient Second-order Minimization.) The F2F alignment method is generally a rotation-only pose update intended to reduce the initial search window required for more precise feature-based approaches.

The AR system 124 then multiplies the F2F-determined transformation by the pose associated with the previous frame, to obtain an initial pose estimate for the current frame.

The AR system 124 then performs image patch similarity matching and tracking between the previous and current frames at block 506. Image patch similarity matching depends on finding matching image patches extracted from the previous frame to those in the current frame. The 'historic' image patches extracted from the previous frame at block 528 are stored by the AR system 124, along with their associated landmark from the original model, for use in future comparisons. Additionally, a value that indicates a successful match to a patch in the current frame has been found is also stored by the AR system 124, to be used in removing such patches from further consideration. Finally, using the initial pose received from block 504, the AR system 124 computes an update pose by minimizing the reprojection error between the landmarks and matched-patches. Examples of image patch similarity matching that may be used are SSD (sum of the squared differences) and NCC (normalized cross correlation) patch-based tracking.

The inputs of an example SSD-tracking function that may be used in block 506 are: (1) M: a list of pairs of landmarks and corresponding 2D points in the previous frame and (2) (Patches)prev: a list of patches extracted from the previous frame, obtained at block 528. M is determined by extracting keypoints and descriptors from the previous frame (at block 506) and searching for corresponding landmarks (determined from the previous frame at block 514) using the initial pose (from block 504) to guide the search.

At decision block 508, the AR system 124 performs a check to see if sufficient matches have been found in block 506. This threshold is determined during testing. In general the threshold needs to be greater than the minimum number of points required to successfully track a pose, which is three. However, a number for the threshold is typically chosen that takes into account the rate of expected errors and the fact that if the pose is correct most points would be expected to match the final pose, and also balances computational resources.

If sufficient matches are found, the estimated pose as determined by the patch-based tracking of block 506 is used as the input to block 514. If insufficient matches are obtained, at block 510 the pose determined by F2F alignment is used as an input to block 514.

At block 514, the AR system 124 obtains keypoints and descriptors for landmarks in the 3D model, using the pose for the current frame obtained from either block 510 or block 512. A descriptor is a set of unique data, generally binary, that can be used to somewhat reliably describe a particular image region, while a keypoint specifies the location of the particular image region in the frame.

Keypoints and descriptors are extracted by the AR system 124 from the current frame at block 528. This is done using known feature detection and extraction system such as ORB or BRISK.

The AR system 124 then matches 3D descriptors and keypoints to image keypoints and descriptors at block 516. One method for doing this is by comparing each 3D model descriptor and keypoint against nearby image keypoints and descriptors extracted from the current frame. Nearby in this case means that the feature defined by an image descriptor and keypoint is within some pixel radius of the reprojected (3D) landmark coordinate. The reprojected landmark coordinate is a 2D feature generated by projecting the landmark into the current image frame using the current estimated pose.

The AR system 124 selects the closest match between each 3D model descriptor and an image keypoint and descriptor based on the Hamming distance, which is a metric for comparing two binary data strings. When comparing two binary strings of equal length, the Hamming distance is the number of bit positions in which the two bits are different. If a Hamming distance lower than an immediately acceptable threshold (e.g. 30) is found, the compared descriptors are immediately marked as a valid match. Otherwise the match having the smallest Hamming distance within a minimum acceptable threshold (e.g. 60) is returned as the match. Once a 3D keypoint and descriptor has been matched with an image keypoint and descriptor, the next 3D keypoint and descriptor is matched in the same way until either the last 3D keypoint and descriptor has been considered or a maximum threshold is reached.

At decision block 518, the AR system 124 performs a check to see if sufficient matches have been found. This threshold is also determined during testing, with a minimum of three. However, the assumption that most features should match is less applicable here than for patch-based tracking because this tracking is done from historical model data, not frame-to-frame, so a much lower hit-rate is possible. Accordingly, the number of matches for sufficiency is likely to be lower than for patch-based tracking. If sufficient matches are found at decision block 518, the estimated pose as either received from block 510 or block 512 is provided at block 520 as the output pose at block 526.

If sufficient matches are found, the output pose is generated by the AR system 124 from the matched keypoint and descriptor pairs at block 522 using a known technique for doing so. For example, the final pose may be computed using a standard least-squares approach that minimizes the reprojection error for a particular pose iteratively, given the correspondences provided by the descriptor matching at block 516. Using the initial pose received from either block 510 or block 512, the AR system 124 projects the 3D landmarks into the current frame and the error between where the landmark is projected to in the image and where the corresponding feature is actually found in the image (reprojection error) is minimized until convergence. Convergence is reached when no update would result in a further reduction of the error across all the points, or a fixed number of iterations has been performed.

The AR system 124 then extracts and stores, at block 524, image patches from the current frame for use with the image patch based tracking at block 506 for the next frame. The estimated pose as either received from block 510 or block 512 is then provided by the AR system 124 to the client application 108 at block 526, as the output pose. Depending on the implementation and division of responsibilities between the AR system and the client application 108, the output pose may also be used by the AR system 124, for example to present AR content as discussed below with reference to FIG. 6.

Figure 6:
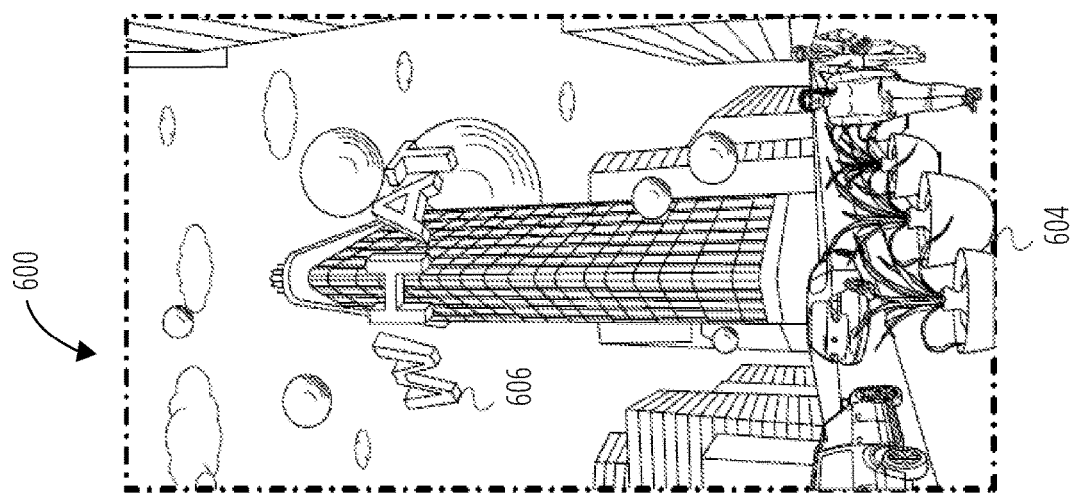
FIG. 6 is an interface flow-diagram illustrating a presentation of location-based AR content, according to some examples.
Figure 6:
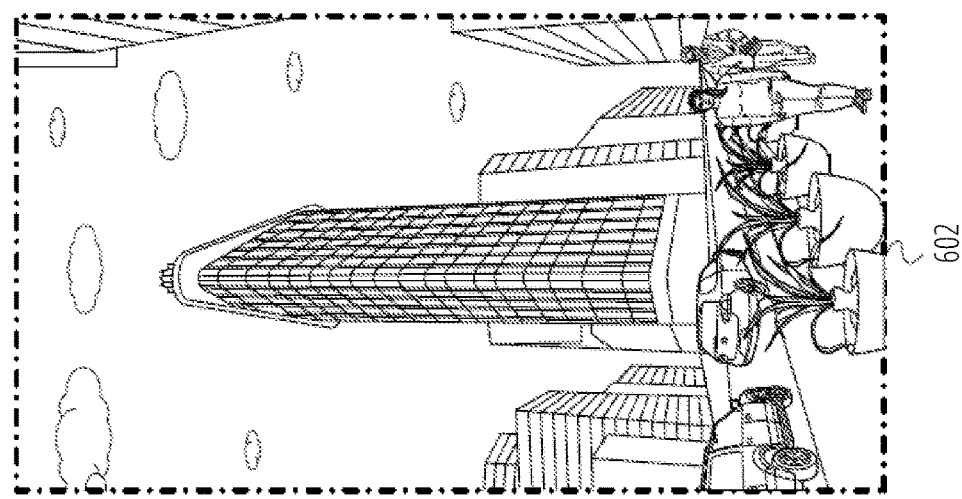

FIG. 6 is an example of an interface flow-diagram illustrating a presentation of location-based AR content presented by the AR system 124, according to certain examples. As seen in FIG. 6, the interface flow diagram interface flow diagram 600 includes an interface diagram 602 and an interface diagram 604.

In one example, a client device 106 causes display of a presentation of the interface diagram 602. For example, the client device 106 captures image data via the camera 242 and generates the interface depicted by the interface diagram 602.

As seen in the interface diagram 604, the AR system 124 accesses media content within a repository (e.g. the database server 116) based on the location of the client device 106. The media content (e.g. the media content 606), comprising virtual objects or other enhancing information or images, may be associated with the location within a media repository, such that reference to the location within the repository identified the media content 606.

The AR system 124 may then, based on the output pose, cause display of a presentation of the media content 606 at a position within a GUI, as seen in the interface diagram 604.

What is claimed is:

1. A method of operating a device, performed by one or more processors, comprising:
   determining, using image-based processing, a current-image pose estimate from a current image frame, a previous image frame and a previous pose;
   receiving an inertial measurement unit (IMU) pose determined from data generated by an inertial measurement unit including motion sensors;
   determining a transformation between the current-image pose estimate and the IMU pose;
   applying the transformation to the current-image pose estimate to generate a pose update; and
   operating the device based on the pose update.

2. The method of claim 1, further comprising:
   low-pass filtering the transformation prior to applying the transformation to the current-image pose estimate.

3. The method of claim 1, wherein the IMU pose is determined as an interpolated value between two IMU pose values having timestamps adjacent to a timestamp of the current image frame.

4. The method of claim 1, wherein the image-based processing comprises:
   determining an intermediate pose by comparing features in the current image frame with features in the previous image frame; and
   determining the current-image pose estimate by comparing features in the current image frame with features in a 3D model using the intermediate pose.

5. The method of claim 4, wherein the IMU pose is determined as an interpolated value between two IMU pose values having timestamps adjacent to a timestamp of the current image frame.

6. The method of claim 1, wherein the image-based processing comprises:
   determining an intermediate pose by comparing image patches in the current image frame with image patches in the previous image frame; and
   determining the current-image pose estimate by comparing features in the current image frame with features in a 3D model using the intermediate pose.

7. The method of claim 6, wherein the IMU pose is determined as an interpolated value between two IMU pose values having timestamps adjacent to a timestamp of the current image frame.

8. A non-transitory machine-readable medium including instructions which, when read by a machine, cause the machine to perform operations for generating a pose for computing system, comprising:
   determining, using image-based processing, a current-image pose estimate from a current image frame, a previous image frame and a previous pose;
   receiving an inertial measurement unit (IMU) pose determined from data generated by an inertial measurement unit including motion sensors;
   determining a transformation between the current-image pose estimate and the IMU pose;
   applying the transformation to the current-image pose estimate to generate a pose update; and
   operating the computing system being based on the pose update.

9. The non-transitory machine-readable medium of claim 8 including instructions which, when read by the machine, cause the machine to perform operations further comprising:
   low-pass filtering the transformation prior to applying the transformation to the current-image pose estimate.

10. The non-transitory machine-readable medium of claim 8, wherein the IMU pose is determined as an interpolated value between two IMU pose values having timestamps adjacent to a timestamp of the current image frame.

11. The non-transitory machine-readable medium of claim 8, wherein the image-based processing comprises:
   determining an intermediate pose by comparing features in the current image frame with features in the previous image frame; and
   determining the current-image pose estimate by comparing features in the current image frame with features in a 3D model using the intermediate pose.

12. The non-transitory machine-readable medium of claim 11, wherein the IMU pose is determined as an interpolated value between two IMU pose values having timestamps adjacent to a timestamp of the current image frame.

13. The non-transitory machine-readable medium of claim 8, wherein the image-based processing comprises:
   determining an intermediate pose by comparing image patches in the current image frame with image patches in the previous image frame; and
   determining the current-image pose estimate by comparing features in the current image frame with features in a 3D model using the intermediate pose.

14. The non-transitory machine-readable medium of claim 13, wherein the IMU pose is determined as an interpolated value between two IMU pose values having timestamps adjacent to a timestamp of the current image frame.

15. A computing system comprising:
   one or more processors;
   motion-sensing components;
   an image capture device to generate image frames, and one or more machine-readable mediums storing instructions that, when executed by the one or more processors, cause the computing system to perform operations comprising:

determining, using image-based processing, a current-image pose estimate from a current image frame, a previous image frame and a previous pose;

receiving an inertial measurement unit (IMU) pose determined from data generated by the motion-sensing components;

determining a transformation between the current-image pose estimate and the IMU pose;

applying the transformation to the current-image pose estimate to generate a pose update; and operating the computing system based on the pose update.

16. The computing system of claim 15 further including instructions which, when executed by the one or more processors, cause the computing system to perform operations further comprising:

low-pass filtering the transformation prior to applying the transformation to the current-image pose estimate.

17. The computing system of claim 15, wherein the IMU pose is determined as an interpolated value between two IMU pose values having timestamps adjacent to a timestamp of the current image frame.

18. The computing system of claim 15, wherein the image-based processing comprises:

determining an intermediate pose by comparing features in the current image frame with features in the previous image frame; and determining the current-image pose estimate by comparing features in the current image frame with features in a 3D model using the intermediate pose.

19. The computing system of claim 18, wherein the IMU pose is determined as an interpolated value between two IMU pose values having timestamps adjacent to a timestamp of the current image frame.

20. The computing system of claim 15, wherein the image-based processing comprises:

determining an intermediate pose by comparing image patches in the current image frame with image patches in the previous image frame; and determining the current-image pose estimate by comparing features in the current image frame with features in a 3D model using the intermediate pose.

* * * * *